(12) United States Patent
Collmer et al.

(10) Patent No.: US 11,548,164 B2
(45) Date of Patent: Jan. 10, 2023

(54) COATING ROBOT

(71) Applicant: Dürr Systems AG, Bietigheim-Bissingen (DE)

(72) Inventors: Andreas Collmer, Vaihingen/Enz (DE); Steffen Hein, Langenbrettach (DE); Thomas Hezel, Asperg (DE)

(73) Assignee: DÜRR SYSTEMS AG, Bietigheim-Bissingen (DE)

( * ) Notice: Subject to any disclaimer, the term of this patent is extended or adjusted under 35 U.S.C. 154(b) by 1140 days.

(21) Appl. No.: 16/089,444

(22) PCT Filed: Mar. 27, 2017

(86) PCT No.: PCT/EP2017/057178
§ 371 (c)(1),
(2) Date: Sep. 28, 2018

(87) PCT Pub. No.: WO2017/167683
PCT Pub. Date: Oct. 5, 2017

(65) Prior Publication Data
US 2020/0324416 A1 Oct. 15, 2020

(30) Foreign Application Priority Data

Apr. 1, 2016 (DE) .................. 10 2016 003 966.3

(51) Int. Cl.
*B25J 11/00* (2006.01)
*B05B 13/04* (2006.01)
(Continued)

(52) U.S. Cl.
CPC ....... *B25J 11/0075* (2013.01); *B05B 13/0421* (2013.01); *B05B 13/0431* (2013.01);
(Continued)

(58) Field of Classification Search
USPC .............................. 118/323, 321; 901/41–43
See application file for complete search history.

(56) References Cited

U.S. PATENT DOCUMENTS 5,065,062 A * 11/1991 Uehara ............... B25J 19/0029
310/90
7,622,001 B2 * 11/2009 Inada ................... B25J 19/0029
239/587.5
(Continued)

FOREIGN PATENT DOCUMENTS

CN 102463571 A 5/2012
CN 102836797 A 12/2012
(Continued)

OTHER PUBLICATIONS

Korean Patent Office Notice of Preliminary Rejection dated Jun. 9, 2021 for Application No. KR 10-2018-7029771 (15 pages with English machine translation).
(Continued)

*Primary Examiner* — Yewebdar T Tadesse
(74) *Attorney, Agent, or Firm* — Bejin Bieneman PLC (57) ABSTRACT

The disclosure concerns a coating robot for coating components, having a robot base, a rotatable robot member, a pivotable proximal robot arm with two arm parts which can be rotated relative to one another and are connected to one another by a bearing ring, a pivotable distal robot arm, a robot hand axis, a connecting flange at the free end of the robot hand axis for connecting an application device and with a line arrangement which is guided from the robot base to the connecting flange for the application device. The disclosure provides that the line arrangement is passed through the first bearing ring between the two arm parts of the proximal robot arm.

24 Claims, 5 Drawing Sheets

(51) Int. Cl.
  *B25J 5/02*  (2006.01)
  *B25J 9/00*  (2006.01)
  *B25J 9/04*  (2006.01)
  *B25J 9/10*  (2006.01)
  *B25J 15/00* (2006.01)
  *B25J 19/00* (2006.01)

(52) U.S. Cl.
  CPC .............. *B25J 5/02* (2013.01); *B25J 9/0018* (2013.01); *B25J 9/047* (2013.01); *B25J 9/102* (2013.01); *B25J 9/108* (2013.01); *B25J 15/0019* (2013.01); *B25J 19/00* (2013.01); *B25J 19/0029* (2013.01); *B25J 19/0075* (2013.01)

(56) References Cited

U.S. PATENT DOCUMENTS

| | | | | |
|---|---|---|---|---|
| 7,650,852 | B2 * | 1/2010 | Clifford | B05B 13/0431 |
| | | | | 118/316 |
| 7,971,504 | B2 * | 7/2011 | Haniya | B25J 19/0029 |
| | | | | 74/490.03 |
| 8,627,780 | B2 * | 1/2014 | Herre | B25J 9/0009 |
| | | | | 118/698 |
| 2006/0294628 | A1 | 12/2006 | Iwai et al. | |
| 2008/0223170 | A1 | 9/2008 | Tealdi et al. | |
| 2008/0258402 | A1 * | 10/2008 | Tamura | B25J 19/0075 |
| | | | | 414/787 |
| 2011/0014371 | A1 * | 1/2011 | Herre | B05B 12/1418 |
| | | | | 901/50 |
| 2012/0325142 | A1 | 12/2012 | Takahashi | |
| 2013/0260606 | A1 | 10/2013 | Hahakura | |
| 2016/0089797 | A1 | 3/2016 | Kawase et al. | |

FOREIGN PATENT DOCUMENTS

| | | | |
|---|---|---|---|
| CN | 202846534 | U | 4/2013 |
| CN | 103753533 | A | 4/2014 |
| CN | 104400794 | A | 3/2015 |
| DE | 69402405 | T2 | 7/1997 |
| DE | 10010615 | A1 | 9/2001 |
| DE | 10139088 | A1 | 2/2003 |
| DE | 102004040162 | A1 | 3/2006 |
| DE | 102008015228 | A1 | 10/2008 |
| DE | 102009012140 | A1 | 9/2010 |
| DE | 102010024260 | A1 | 7/2011 |
| DE | 102013109867 | A1 | 3/2014 |
| DE | 202013104544 | U1 | 1/2015 |
| DE | 202013105910 | U1 | 3/2015 |
| EP | 0511977 | B1 | 3/1994 |
| EP | 1396314 | A1 * | 3/2004 ............ B25J 13/085 |
| EP | 1930129 | A1 | 6/2008 |
| EP | 2213425 | B1 | 6/2014 |
| JP | H02 298482 | A | 12/1990 |
| JP | H03-281190 | A | 12/1991 |
| JP | 2012501820 | A | 1/2012 |
| JP | 2013006271 | A | 1/2013 |
| JP | 2015085469 | A | 5/2015 |
| KR | 10-1323918 | B1 | 10/2013 |
| KR | 1020160001771 | | 1/2016 |
| WO | 2007037131 | A1 | 4/2007 |
| WO | 2012028197 | A1 | 3/2012 |

OTHER PUBLICATIONS

JPO Decision of Rejection for Application No. JP2018-546869 dated Aug. 31, 2021 (7 Pages; with English translation).
International Search Report and Written Opinion for PCT/EP2017/057178 dated Jun. 29, 2017 (14 pages; with English translation).
Chinese Patent Office—Office Action and Search Report for Application No. CN201780022090.6 dated May 8, 2021 (11 pages; with English translation).
Notification of Reasons for Rejection from JPO for JP 2018-546869 dated Nov. 24, 2020 (15 pages; with English translation).

\* cited by examiner

COATING ROBOT

CROSS-REFERENCE TO RELATED APPLICATIONS

This application is a national stage of, and claims priority to, Patent Cooperation Treaty Application No. PCT/EP2017/057178, filed on Mar. 27, 2017, which application claims priority to German Application No. DE 10 2016 003 966.3, filed on Apr. 1, 2016, which applications are hereby incorporated herein by reference in their entireties.

The disclosure concerns a coating robot for coating components, in particular a painting robot for painting motor vehicle body components.

BACKGROUND

Coating robots are known from the state of the art (e.g. DE 10 2013 109 867 A1, EP 0 511 977 B1, EP 2 213 425 B1), which have a total of seven movable axes, which allows a wide range of motion. These well-known coating robots have a robot base, a rotatable robot member, a proximal robot arm ("arm 1"), a distal robot arm ("arm 2") and a multi-axis robot hand axis. The proximal robot arm is divided into two arm parts that can be rotated relative to each other about the longitudinal axis of the proximal robot arm. A line arrangement with fluid lines and electrical lines leads from the robot base to the connecting flange of the robot hand axis, whereby the line arrangement runs in the area of the proximal robot arm outside the proximal robot arm, i.e. outside the axis between the two arm parts of the proximal robot arm. The pivot bearing between the two arm parts of the proximal robot arm, which can be rotated relative to each other, is thus bypassed by the line arrangement on the outside of the proximal robot arm.

The disadvantage of these well-known coating robots is the routing of the line arrangement, which leads to various problems during operation. On the one hand, the line arrangement protrudes beyond the outer contour of the coating robot, which is undesirable. On the other hand, the line arrangement is also subjected to high mechanical stress.

Regarding the state of the art the following are referenced, DE 100 10 615 A1, US 2006/0294628 A1, US 2013/0260606 A1, DE 694 02 405 T2, DE 10 2004 040 162 A1, DE 10 2010 024 260 A1, DE 101 39 088 A1, DE 10 2009 012 140 A1, DE 20 2013 105 910 U1, DE 20 2013 104 544 U1, US 2008/0223170 A1, US 2016/0089797 A1, WO 2012/028197 A1.

DETAILED DESCRIPTION

In accordance with the state of the art, the exemplar coating robot initially has a robot base, which is preferably mounted in a fixed position.

In addition, in accordance with the state of the art, the exemplar coating robot has a rotatable robot member that is attached to the robot base and can rotate about a first axis relative to the robot base.

Furthermore, in accordance with the state of the art, the exemplar coating robot has a proximal robot arm, also known as "arm 1" according to the usual technical terminology, the proximal robot arm being attached to the rotatable robot member and being pivotable about a second axis relative to the rotatable robot member.

The proximal robot arm ("arm 1") consists of two arm parts which can be rotated relative to each other about a third axis by means of a first bearing ring, the third axis being essentially aligned along the longitudinal axis of the proximal robot arm. The rotary movement of the two arm parts of the proximal robot arm relative to each other is therefore essentially around the longitudinal axis of the proximal robot arm.

However, it should be noted that the disclosure does not require the third axis to be exactly parallel to the longitudinal axis of the proximal robot arm. Rather, it is sufficient in the context of the disclosure if the third axis is aligned substantially parallel to the longitudinal axis of the proximal robot arm, whereby for example angular deviations of ±20°, ±10° or ±5° are possible. It should also be mentioned in this context that the proximal robot arm can also be slightly bent or curved.

In addition, the exemplar coating robot includes a distal robot arm, also known as "arm 2" according to common technical terminology, whereby the distal robot arm is attached to the proximal robot arm and is pivotable about a fourth axis relative to the proximal robot arm.

In accordance with the state of the art, a robot hand axis is attached to the distal robot arm, which has several movable axes, as known from the state of the art. In a preferred exemplary embodiment of the disclosure, the robot hand axis has three moving axes. However, in the context of the disclosure, it is also possible, for example, that the robot hand axis has two movable axes or four movable axes.

At the distal end of the robot hand axis there is a connection flange for connecting an application device, such as a rotary atomizer.

Furthermore, in accordance with the state of the art, the exemplar coating robot comprises a line arrangement which is led from the robot base to the connecting flange for the application device and serves to supply the application device.

The exemplar coating robot includes a line arrangement that is led through the first bearing ring between the two arm parts of the proximal robot arm. This means that the line arrangement in this area runs inside the proximal robot arm and therefore does not project outwards beyond the outer contour of the coating robot.

In one embodiment of the disclosure, the first axis between the robot base and the rotating robot member and the second axis between the rotating robot member and the proximal robot arm in the mathematical sense are skewed. This means that these two axes do not intersect and do not run parallel to each other. The first axis and the second axis are preferably arranged in an axis distance (in the mathematical sense the perpendicular distance) in the range of 10 cm-55 cm, 20 cm-25 cm or 25 cm-35 cm, whereby an axis distance of 30 cm between the first axis and the second axis has proven to be advantageous.

It should also be mentioned that the two arm parts of the proximal robot arm ("arm 1"), which can be rotated relative to each other, can preferably be rotated over an angle of rotation range of at least 90°, 135°, 180°, 225° or even at least 240° to allow the greatest possible range of movement.

In one embodiment of the disclosure, however, the first axis between the robot base and the rotatable robot member preferably runs parallel to the third robot axis between the two rotatable arm parts of the proximal robot arm when the proximal robot arm is vertically aligned.

Alternatively, the first axis and the third axis can intersect, for example with an angle of 1°-45°, 2°-35°, 5°-25° or 10°-20°.

In one embodiment of the disclosure, the rotatable robot member is connected to the robot base by a second bearing ring. The line arrangement exits the interior of the robot base and is then routed outside the second bearing ring and outside the robot base to the rotatable robot member. The line arrangement between the robot base and the rotatable robot member preferably forms a line elbow with a curvature of approx. 90°.

The rotating robot member may have two lateral holding arms, between which the proximal robot arm is pivotably mounted. The line arrangement is guided from the robot base from below essentially vertically upwards between the two holding arms of the rotatable robot member and enters the proximal robot arm there.

Behind the first bearing ring between the two rotatable arm parts of the proximal robot arm, the line arrangement then may leave the proximal robot arm outwards again and is then guided outside the coating robot to the distal robot arm. The line arrangement then returns from the proximal robot arm to the distal robot arm from the outside.

Finally, the line arrangement is then routed inside the distal robot arm and the robot hand axis to the connection flange for the application device (e.g. rotary atomizer).

The line arrangement may be routed from the robot base to the rotatable robot member in such a way that the line arrangement intersects the second axis, in particular at right angles, which has proven to be advantageous.

With regard to the position designations "before" and "behind" used in this description, it should be noted that these position designations refer to the kinematic sequence of the individual robot components along the serial robot kinematics. The robot base is thus arranged in this sense in front of the robot arms, while the robot hand axis is behind the robot arms.

The line arrangement may include electrical lines and fluid lines. The fluid lines can include, for example, a drive air line, a brake air line, a shaping air line, a bearing air line or a paint line for paint. The electric line, on the other hand, can comprise, for example, a high-voltage line for electrostatic coating agent charging or a sensor line for sensing a sensor in the application device, to name but a few examples.

It has already been stated above that the line arrangement is passed through the first bearing ring between the rotatable arm parts of the proximal robot arm. In one embodiment, the first bearing ring has two line bushings, namely a first line bushing for the electrical lines and a separate second line bushing for the fluid lines.

The first line bushing for the electrical lines may be arranged centrally in the first bearing ring, while the second line bushing for the fluid lines is preferably arranged eccentrically in the first bearing ring.

In practice, the arrangement of electric motors in the coating robot requires an explosion protection enclosure, which usually requires an exchange of air between the interiors of the two arm parts of the proximal robot arm. The first line bushing for the electrical cables is therefore preferably designed in such a way that such an air exchange is made possible.

In general, with regard to robot kinematics, it should be mentioned that the rotating robot member may be located at the top of the robot base. In the context of the disclosure, however, it is also possible that the rotatable robot member is arranged on the underside of the robot base or to the side next to the robot base.

It should also be mentioned that the first axis between the rotating robot member and the robot base may be aligned essentially vertically. However, in the context of the disclosure there is also the possibility that the first axis is aligned horizontally or obliquely.

In contrast, the second axis between the proximal robot arm and the rotatable robot member is aligned essentially horizontally in one embodiment. However, in the context of the disclosure there is also the possibility that the second axis is aligned vertically or obliquely.

In one embodiment of the disclosure, the first axis is therefore aligned vertically, while the second axis is aligned horizontally.

Furthermore, it should be mentioned that the robot base can be stationary, for example on a cabin wall of a painting cabin, on a mounting column or on a mounting frame. Alternatively, however, it is also possible that the robot base is arranged on a traversing rail and can be moved along the traversing rail.

In one embodiment of the disclosure, the first bearing ring between the two rotatable arm parts of the proximal robot arm is part of a hollow shaft gear unit and is driven via a countershaft gear. Preferably, the reduction gearbox is flange-mounted radially on the outside of the hollow shaft gearbox, with the output shaft of the reduction gearbox running parallel to the third axis.

The countershaft gear may be inside the proximal robot arm, for example inside the distal arm part of the proximal robot arm. Preferably, the proximal robot arm therefore has an explosion protection enclosure, especially in the area of the distal arm part of the proximal robot arm, where the countershaft gear is located.

In the exemplar coating robot, application-related components such as a color changer, a metering pump, coating agent valves, a color pressure regulator or a high-voltage generator, to name but a few examples, can also be mounted on the distal robot arm or inside the distal robot arm. A linear color changer, as known from DE 10 2008 015 228 A1, is particularly suitable for mounting a color changer in the distal robot arm.

Figure 1:
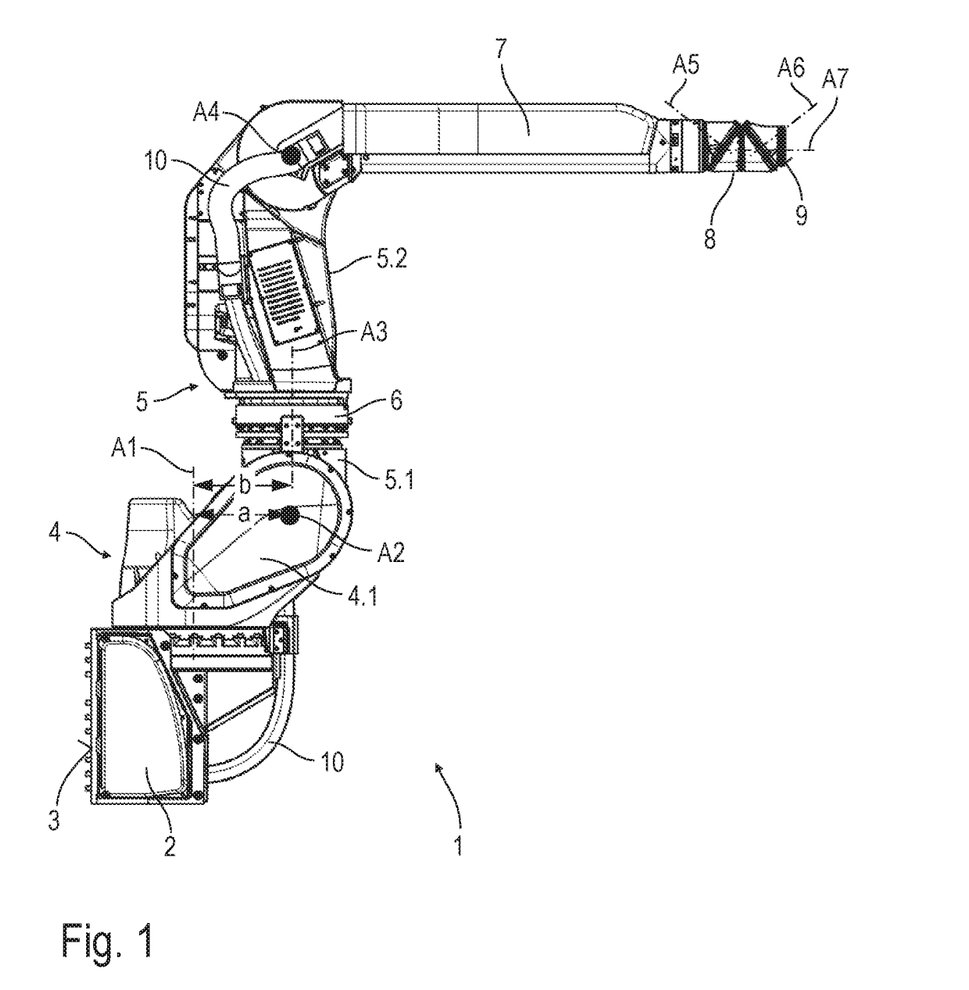
FIG. 1 a side view of an exemplar painting robot.
Figure 2:
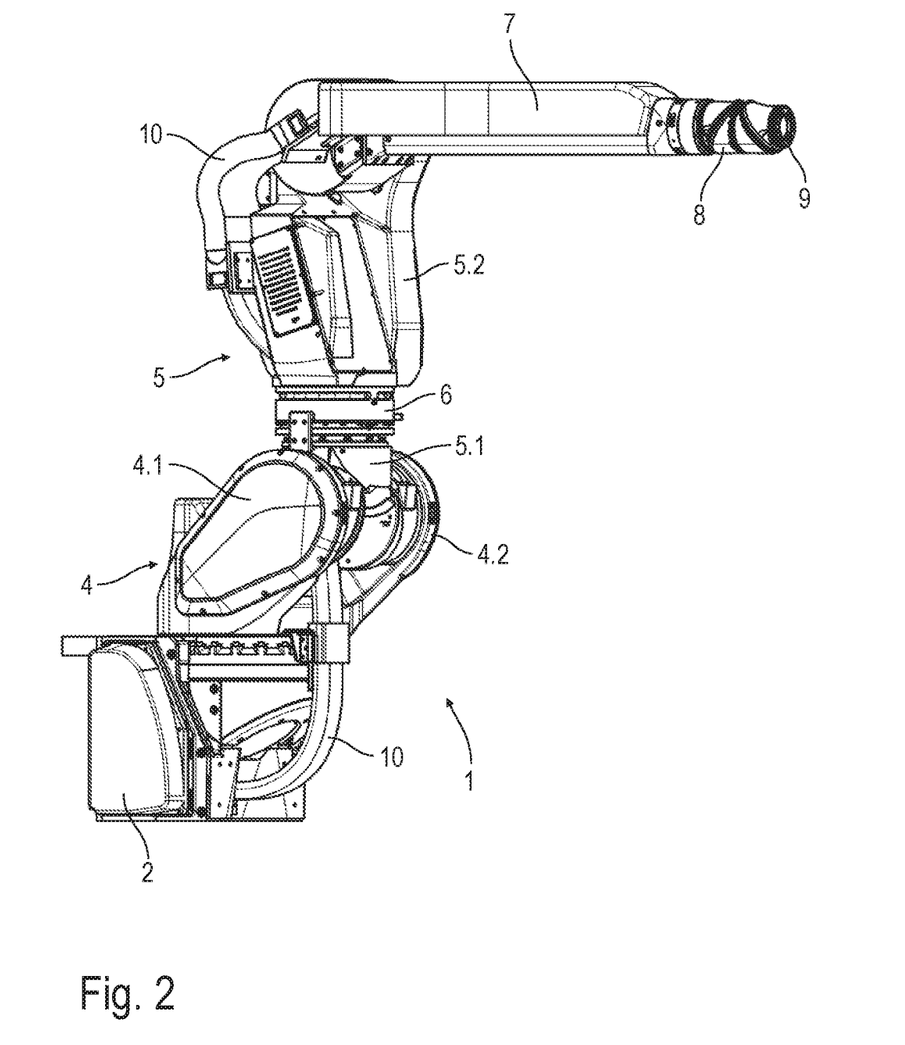
FIG. 2 a perspective view of the painting robot from FIG. 1.

The painting robot 1 initially has a robot base 2, which is mounted stationary with its mounting flange 3, for example on a lateral cabin wall of a painting cabin, on a mounting frame or on a mounting column.

On the top side of the robot base is a rotatable robot member 4, which can be rotated about a vertical axis A1 relative to robot base 2.

The rotatable robot member 4 has two lateral support arms 4.1, 4.2 between which a proximal robot arm 5 ("arm 1") is pivotably arranged, the proximal robot arm 5 being pivotable about a second horizontal axis A2 relative to the rotatable robot member 4.

The two axes A1 and A2 are in a mathematical sense skewed, i.e. the axes A1 and A2 do not intersect and do not run parallel to each other. Here the axes A1 and A2 are arranged in an axis distance (in the mathematical sense the perpendicular distance) a=30 cm.

The proximal robot arm 5 consists of two arm parts 5.1, 5.2, which can be rotated relative to each other about an axis A3, whereby the axis A3 essentially corresponds to the longitudinal axis of the proximal robot arm 5. For this purpose, the two arm parts 5.1, 5.2 of the proximal robot arm 5 are connected to each other by means of a bearing ring 6, whereby the bearing ring 6 allows the two arm parts 5.1, 5.2 to rotate relative to each other.

With a vertical alignment of the proximal robot arm 5—as shown in FIG. 1—the two axes A1 and A3 are arranged at an axial distance b=30 cm.

Furthermore, the painting robot 1 has a distal robot arm 7, which is also referred to as "arm 2" in the usual technical terminology of robot technology. The distal robot arm 7 is attached to the end of the proximal robot arm 5 and pivots about an axis A4.

Application components such as a color changer (e.g. linear color changer), a metering pump, a color pressure regulator, coating agent valves or a high-voltage generator can be mounted in the distal robot arm 7.

At its end, the distal robot arm 7 carries a conventional robot hand axis 8 with three further movable axes A5, A6, A7.

At its free end, the robot hand axis 8 has a connection flange 9 for mounting an application device (e.g. rotary atomizer).

A line arrangement 10 is led from robot base 2 to the connecting flange 9 of robot hand axis 8 to supply the connected application device.

The line arrangement 10 first exits the robot base 2 in a horizontal direction and is then guided upwards at a 90° angle, where the line arrangement is then guided between the two armrests 4.1, 4.2 of the rotatable robot member 4. The line arrangement 10 then enters the arm part 5.1 of the proximal robot arm 5. The line arrangement is then led through the bearing ring 6 between the two rotatable arm parts 5.1, 5.2 and then leaves the arm part 5.2 again to the outside. The line arrangement 10 then returns to the distal robot arm 7 in the area of axis A4 and is then guided inside the distal robot arm 7 and the robot hand axis 8 to the connecting flange 9.

Figure 3:
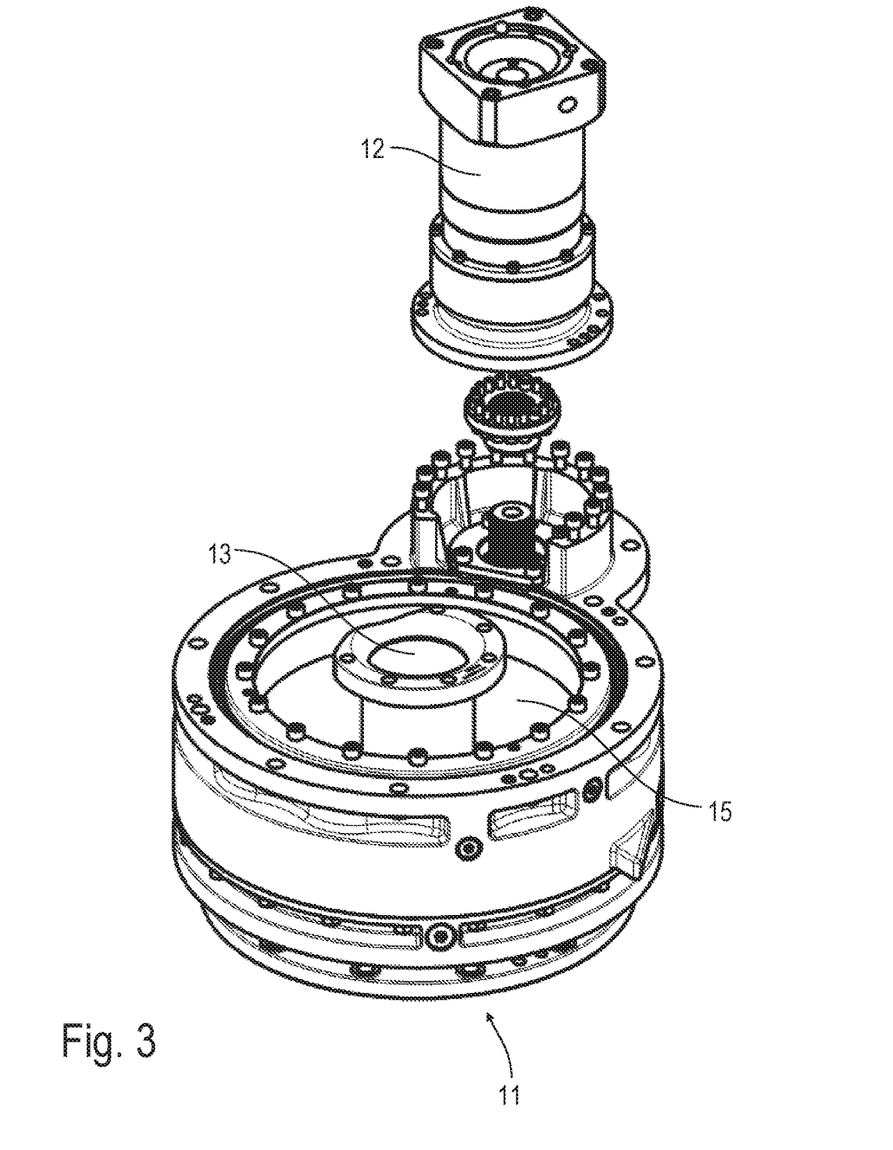
FIG. 3 a hollow shaft gear of the painting robot from FIGS. 1 and 2 with a countershaft gear, FIG. 4 the hollow shaft gear unit from FIG. 3 with electric cables that pass through the hollow shaft gear unit, FIG. 5 the hollow shaft gear unit from FIG. 3 with fluid lines that pass through the hollow shaft gear unit, and FIG. 6 a cross-sectional view through the hollow shaft gear unit with the electrical lines and the fluid lines

FIG. 3 shows a hollow shaft gear 11, which is arranged between the two rotatable arm parts 5.1, 5.2 of the proximal robot arm 5 and which contains the bearing ring 6. A countershaft gear 12 is flanged radially to the outside of the hollow shaft gear 11 in order to drive the hollow shaft gear 11 and thereby rotate the two arm parts 5.1, 5.2 of the proximal robot arm 5 relative to each other.

Figure 4:
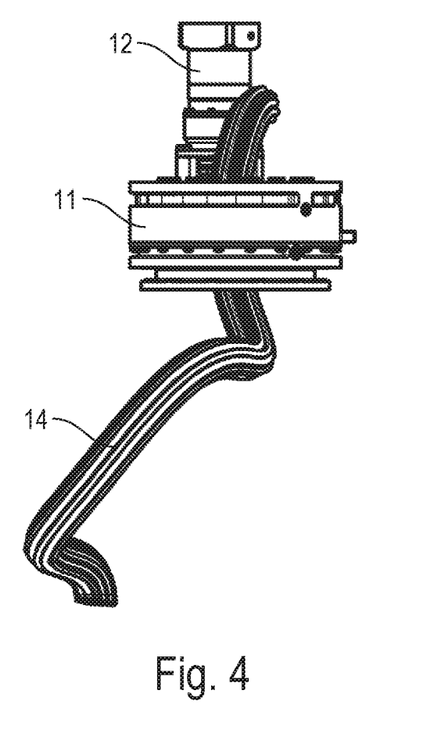

The hollow shaft gear unit contains a first cable bushing for accommodating electrical cables (see FIG. 4).

Figure 5:
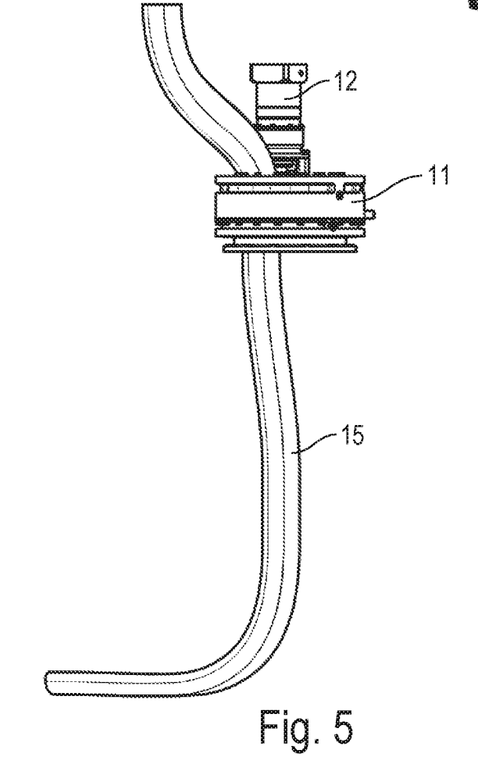

Furthermore, another line bushing 15 for fluid lines 16 is located eccentrically in the hollow shaft gear unit 11 (see FIG. 5).

Figure 6:
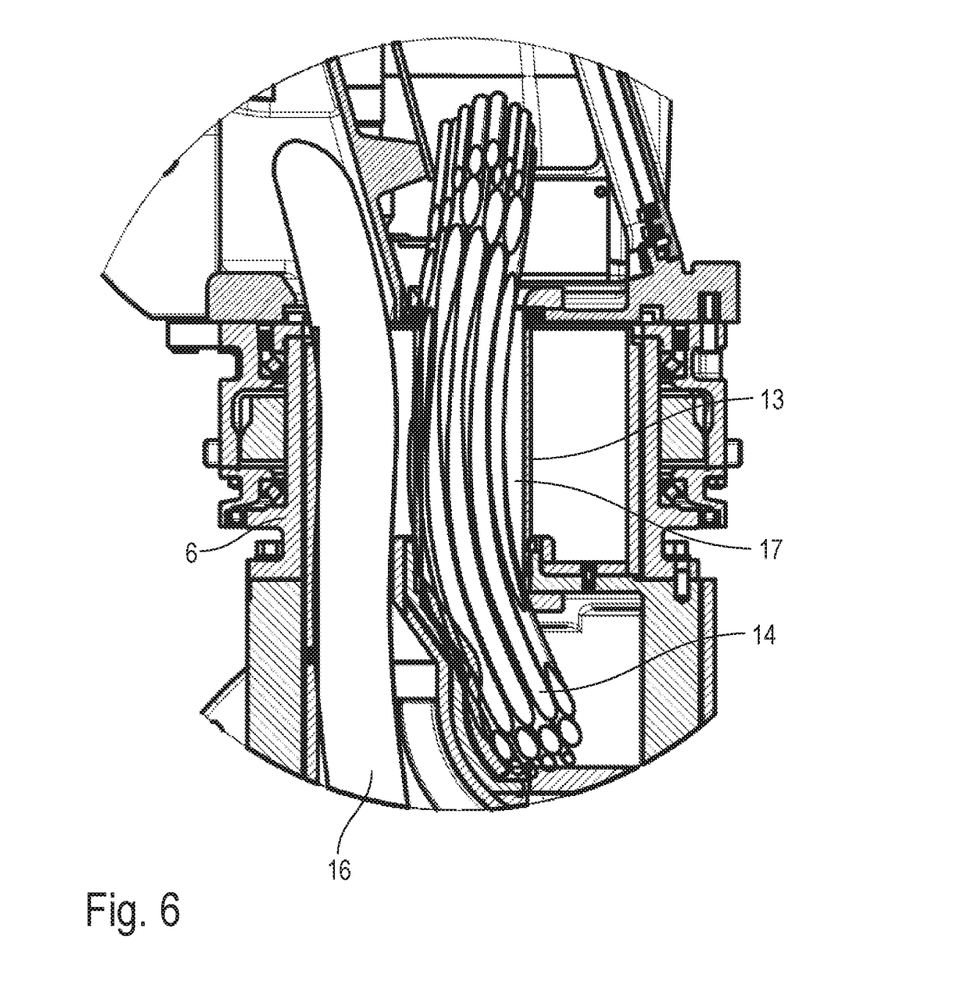

From the cross-sectional view in FIG. 6 it can also be seen that the cable duct 13 for the electrical cables 14 leaves an air gap 17 free to allow an exchange of air between the interiors of the arm parts 5.1, 5.2 of the proximal robot arm 5, which is important in the context of an explosion protection enclosure.

The examplar painting robot 1 has the following advantages:

The mobility of the seven-axis painting robot 1 is greater than that of a conventional six-axis painting robot without the A3 axis.

The seven-axis painting robot 1 can be programmed like a conventional six-axis painting robot. However, the additional axis A3 allows the painting robot 1 to avoid obstacles during the same path or to additionally move and position arms and axis joints without leaving the required path and orientation.

The line arrangement 10 runs essentially in the so-called neutral fiber of the robot axis and is therefore only subjected to minimal mechanical stress during a robot movement.

The fluid lines 16 are spatially separated from the electrical lines 14 and the countershaft gear 12.

The line arrangement 10 can contain more than 50 fluid lines 16 for paint, whereby the individual fluid lines can have an outer diameter of 9 mm.

The line arrangement 10 is characterised by soft transitions and is protected against bending, abrasion and deformation.

Compared to conventional six-axis painting robots, the seven-axis painting robot 1 enables larger pivoting angles in the main and manual axes.

In painting robot 1, possible leaks in the fluid lines 16 can be repaired simply by replacing the defective line arrangement 10.

In the event of leaks in the fluid lines 16, gravity causes the leakage to flow down into the spray booth.

The line arrangement 10 does not protrude, or only barely protrudes, above the outer contour of painting robot 1 and has a very short installation distance.

The seven-axis painting robot 1 is similar in design to a conventional six-axis painting robot and enables the same process functions and application techniques.

In painting robot 1, the same insulation distances occur on the distal robot arm 7, which is important for electrostatic coating agent charging.

The seven-axis painting robot 1 has the same load-bearing capacity as a conventional six-axis painting robot.

The seven-axis painting robot 1 can be mounted like conventional six-axis painting robots, i.e., for example, stationary or movable along a traversing rail.

The seven-axis painting robot 1 has many identical parts with a conventional six-axis painting robot, which reduces production costs in the parallel production of the seven-axis painting robots 1 and the six-axis painting robots, since larger quantities of the identical parts are possible.

The disclosure is not limited to the preferred exemplary embodiment described above. Rather, a large number of variants and modifications are possible which also make use of the inventive idea and therefore fall within the scope of protection. In particular, the disclosure also claims protection for the subject matter and the features of the dependent claims irrespective of the claims referred to in each case.

The invention claimed is:

1. Coating robot for coating components, the coating robot comprising:
    a) a robot base,
    b) a rotatable robot member mounted on the robot base and rotatable about a first axis relative to the robot base,
    c) a proximal robot arm mounted on the rotatable robot member and pivotable relative to the rotatable robot member about a second axis, the proximal robot arm having two arm parts which are rotatable relative to each other about a third axis by means of a first bearing ring which is aligned substantially along the longitudinal axis of the proximal robot arm,
    d) a distal robot arm attached to the proximal robot arm and pivotable about a fourth axis relative to the proximal robot arm, e) a robot hand axis which is attached to the distal robot arm and has several movable axes,
f) a connecting flange at the free end of the robot hand axis for connecting an application device, and
g) at least one line arrangement which is guided from the robot base to the connecting flange for the application device,
h) wherein the at least one line arrangement is guided through the first bearing ring between the two arm parts of the proximal robot arm,
i) the rotatable robot member has two lateral holding arms,
j) the proximal robot arm is pivotably mounted between the two lateral holding arms of the rotatable robot member, and
k) the at least one line arrangement extends from the robot base between the two lateral holding arms of the rotatable robot member from bottom to top and enters the proximal robot arm from bottom to top.

2. Coating robot according to claim 1, wherein the first axis and the second axis are skew in a mathematical sense with an axial distance in the range of 10 cm-55 cm.

3. Coating robot according to claim 1, wherein the two arm parts of the proximal robot arm can be rotated relative to one another with a rotation angle range of at least 90°.

4. Coating robot according to claim 1, wherein the first axis and the third axis run parallel with an axial distance in the range of 5 cm-100 cm.

5. Coating robot according to claim 1, wherein the first axis and the third axis intersect.

6. Coating robot according to claim 1, wherein
a) the rotatable robot member is connected to the robot base by a second bearing ring, and
b) the at least one line arrangement exits the robot base and is disposed outside the second bearing ring and extends outside the robot base to the rotatable robot member.

7. Coating robot according to claim 1, wherein
a) the at least one line arrangement leaves the proximal robot arm behind the first bearing ring again and is guided outside to the distal robot arm, and
b) the at least one line arrangement is guided from the proximal robot arm into the distal robot arm from the outside, and
c) the at least one line arrangement is guided inside the distal robot arm and the robot hand axis to the connecting flange.

8. Coating robot according to claim 1, wherein the at least one line arrangement intersects the second axis.

9. Coating robot according to claim 1, wherein the at least one line arrangement comprises electrical lines and fluid lines.

10. Coating robot according to claim 9, wherein the fluid lines comprise the following fluid lines:
a) at least one drive air line for drive air to drive a compressed air turbine of the rotary atomizer,
b) at least one brake air line for brake air for braking a compressed air turbine of the rotary atomizer,
c) at least one shaping air duct for shaping air to form a spray jet of the rotary atomizer,
d) at least one bearing air line for bearing clearance for an air bearing of the rotary atomizer,
e) at least one paint line for paint.

11. Coating robot according to claim 10, wherein the electrical lines comprise the following electrical cables:
a) one earthing cable for application equipment,
b) a sensor cable for sensing a sensor in the application device.

12. Coating robot according to claim 9, wherein
a) the first bearing ring has a first cable bushing for the electrical cables between the two arm parts of the proximal robot arm, and
b) the first bearing ring between the two arm parts of the proximal robot arm has a separate second line bushing for the fluid lines.

13. Coating robot according to claim 12, wherein
a) the first cable bushing for the electrical cables is arranged centrally in the first bearing ring, and
b) the second line bushing for the fluid lines is arranged eccentrically in the first bearing ring.

14. Coating robot according to claim 13, wherein the first cable bushing for the electric cables also permits an exchange of air between the inner spaces of the two arm parts of the proximal robot arm.

15. Coating robot according to claim 1, wherein the rotatable robot member is arranged at the top of the robot base.

16. Coating robot according to claim 1, wherein the rotatable robot member is arranged on the underside of the robot base.

17. Coating robot according to claim 1, wherein the rotatable robot member is arranged on the side of the robot base.

18. Coating robot according to claim 1, wherein
a) the first axis is substantially perpendicular or substantially horizontal, and
b) the second axis is substantially horizontal or substantially vertical, and
c) the third axis is or can be aligned substantially vertically or substantially horizontally.

19. Coating robot according to claim 1, wherein the robot base is fixedly arranged.

20. Coating robot according to claim 1, wherein the robot base is mounted on a traversing rail and can be moved along the traversing rail.

21. A coating robot according to claim 1, wherein the first bearing ring between the two arm parts of the proximal robot arm is part of a hollow shaft gear unit.

22. Coating robot according to claim 21, wherein
a) a countershaft gear is flanged radially on the outside of the hollow shaft gear with an output shaft parallel to the third axis, and
b) the drive motor is arranged inside the proximal robot arm, and
c) the proximal robot arm has an explosion protection enclosure.

23. Coating robot according to claim 1, wherein at least one of the following application-technical components are mounted on the distal robot arm or inside the distal robot arm:
a) a colour changer,
b) a dosing pump for dosing the coating agent to be applied,
c) coating agent valves,
d) a high-voltage generator for electrostatic coating agent charging.

24. Coating robot for coating components, the coating robot comprising:
a) a robot base,
b) a rotatable robot member mounted on the robot base and rotatable about a first axis relative to the robot base,
c) a proximal robot arm mounted on the rotatable robot member and pivotable relative to the rotatable robot member about a second axis, the proximal robot arm having two arm parts which are rotatable relative to each other about a third axis by means of a first bearing ring which is aligned substantially along the longitudinal axis of the proximal robot arm, d) a distal robot arm attached to the proximal robot arm and pivotable about a fourth axis relative to the proximal robot arm, e) a robot hand axis which is attached to the distal robot arm and has several movable axes, f) a connecting flange at the free end of the robot hand axis for connecting an application device, and g) at least one line arrangement which is guided from the robot base to the connecting flange for the application device, h) wherein the at least one line arrangement extends through the first bearing ring between the two arm parts of the proximal robot arm, i) the rotatable robot member is connected to the robot base by a second bearing ring, and j) the at least one line arrangement exits the robot base and is disposed outside the second bearing ring and extends outside the robot base to the rotatable robot member.

* * * * *